(12) United States Patent
Schwochert

(10) Patent No.: US 11,027,322 B2
(45) Date of Patent: Jun. 8, 2021

(54) TUBE PRODUCT, TUBE BENDER AND METHOD FOR USING SAME

(71) Applicant: John P. Schwochert, Omro, WI (US)

(72) Inventor: John P. Schwochert, Omro, WI (US)

( * ) Notice: Subject to any disclaimer, the term of this patent is extended or adjusted under 35 U.S.C. 154(b) by 285 days.

(21) Appl. No.: 16/165,461

(22) Filed: Oct. 19, 2018

(65) Prior Publication Data

US 2019/0118237 A1 Apr. 25, 2019

Related U.S. Application Data

(60) Provisional application No. 62/574,361, filed on Oct. 19, 2017.

(51) Int. Cl.
| | |
|---|---|
| *B21D 7/06* | (2006.01) |
| *F16L 9/22* | (2006.01) |
| *F01N 13/08* | (2010.01) |
| *F01N 13/18* | (2010.01) |
| *F16L 27/10* | (2006.01) |
| *B60K 13/04* | (2006.01) |
| *B21D 15/06* | (2006.01) |
| *F16L 51/03* | (2006.01) |

(52) U.S. Cl.
CPC ............... *B21D 7/06* (2013.01); *F01N 13/08* (2013.01); *F01N 13/1816* (2013.01); *F16L 9/22* (2013.01); *F16L 27/1004* (2013.01); *B21D 15/06* (2013.01); *B60K 13/04* (2013.01); *F01N 2470/12* (2013.01); *F16L 51/03* (2013.01)

(58) Field of Classification Search
CPC ........ B21D 15/06; B21D 15/00; B21D 15/04; B21D 41/02; B21C 37/124; B21C 37/205

USPC .......................... 72/367.1, 370.19, 305, 705
See application file for complete search history.

(56) References Cited

U.S. PATENT DOCUMENTS

| | | | | |
|---|---|---|---|---|
| 743,193 | A * | 11/1903 | Rainforth | B21C 37/104 72/368 |
| 2,347,086 | A * | 4/1944 | Curtiss | B29C 53/30 425/393 |
| 3,015,354 | A * | 1/1962 | Wood | B21D 15/06 72/59 |
| 3,019,820 | A * | 2/1962 | Yowell | F16J 3/047 138/121 |
| 3,092,896 | A * | 6/1963 | Stinehelfer | B21D 15/06 29/600 |
| 3,457,751 | A * | 7/1969 | Lindeman | B21D 15/06 72/105 |
| 3,477,265 | A * | 11/1969 | Szitar, Jr. | B21D 41/02 72/117 |
| 3,595,048 | A * | 7/1971 | Holt | B21D 15/06 72/84 |
| 3,595,049 | A * | 7/1971 | Holt | B21D 15/06 72/110 |

(Continued)

*Primary Examiner* — Adam J Eiseman
*Assistant Examiner* — Bobby Yeonjin Kim
(74) *Attorney, Agent, or Firm* — Davis & Kuelthau, sc; Joseph S. Heino; Erin E. Kaprelian

(57) ABSTRACT

A system comprises a tube and a bender. The tube comprises a first cylindrical portion and a second cylindrical portion. An undulated portion is disposed between the first cylindrical portion and the second cylindrical portion. Alternatively, the tube can comprise a plurality of cylindrical portions and undulated portions. The bender comprises a plurality of L-shaped brackets and a plurality of U-shaped brackets, and further includes a driving rod subassembly.

9 Claims, 7 Drawing Sheets

(56) References Cited

U.S. PATENT DOCUMENTS

| | | | | |
|---|---|---|---|---|
| 3,952,575 A | * | 4/1976 | Straza | B21D 15/06 72/393 |
| 4,366,691 A | * | 1/1983 | Schafer | B21D 15/06 72/84 |
| 5,211,046 A | * | 5/1993 | Inagaki | B21D 15/06 72/305 |
| 5,660,419 A | | 8/1997 | Kim | |
| 5,967,193 A | | 10/1999 | Nagai et al. | |
| 6,116,287 A | | 9/2000 | Gropp et al. | |
| 6,151,893 A | | 11/2000 | Watanabe et al. | |
| 6,282,939 B1 | * | 9/2001 | Minamidate | B21D 51/12 72/302 |
| 6,419,280 B2 | | 7/2002 | Uegane et al. | |
| 7,264,280 B2 | | 9/2007 | Kim | |
| 7,284,771 B2 | | 10/2007 | Baumann et al. | |
| 7,931,244 B1 | * | 4/2011 | Sipe | F16B 2/065 248/229.2 |
| 8,972,950 B2 | | 3/2015 | Hebisch | |
| 9,181,846 B2 | | 11/2015 | Kim | |
| 9,631,751 B2 | | 4/2017 | Kim | |
| 2003/0070470 A1 | * | 4/2003 | Uegaki | B21D 1/06 72/705 |
| 2014/0197282 A1 | * | 7/2014 | Turner | F16L 3/20 248/49 |
| 2015/0184778 A1 | * | 7/2015 | Zeisberg | F16L 11/15 138/121 |
| 2016/0047496 A1 | * | 2/2016 | O'Connell | F16L 3/08 248/72 |
| 2016/0059287 A1 | * | 3/2016 | DiPierdomenico | B21D 17/04 72/252.5 |

* cited by examiner

TUBE PRODUCT, TUBE BENDER AND METHOD FOR USING SAME

FIELD OF THE INVENTION

The present invention relates generally to metallic tubes and to tools and methods used to form one or more bends in such tubes. More particularly, the present invention relates to a specific type of tube product that allows for bending of the tube product as may be desired by using a custom bending tool, or bender.

BACKGROUND OF THE INVENTION

Tubes and tube products are well known for a wide variety of applications. Tubes generally take the shape of a long, hollow cylinder through which air, exhaust, fluids, and other materials can flow. One use of tubes is the automotive industry. For example, tubes are used for coolant flow, fuel flow, and exhaust flow, among other applications. In the particular case of exhaust flow, a number of tubes, often metal tubes, are generally formed as part of an exhaust pipe assembly. At least one tube may run from the exhaust manifold of the engine to an underbody catalytic converter. Another pipe runs from the catalytic converter to an exhaust port disposed at the rear of the vehicle. Depending on the make and/or model of the automobile, other and more complex arrangements may be presented.

Because each make and model of automobile has a different underbody profile, exhaust tubes or pipes are made of tubes comprising different shapes, with each being situated in a particular position and suspended by different types of hangers. Due to their underbody placement, exhaust tubes or pipes may be adversely affected by environmental factors, such as weather, temperature, and road conductions. In colder climates where salt is often used liberally for road de-icing, the useful life of underbody components, including exhaust pipes, may be significantly shortened. The life of an exhaust pipe may also be affected by the exhaust itself. Exhaust pipes are exposed to corrosive acidic moisture that is a byproduct of gasoline and air combustion. In short, exhaust pipes can wear out due to corrosion, rust, and physical damage, due to both internal and external factors. When exhaust pipes wear out, replacement of the worn pipes is necessary.

Replacing exhaust pipes and tubes can be done using a variety of methods. One way is to purchase a flexible tube. However, this is generally meant to be a short-term solution, as flexible tubes lack the quality of the metal tubes they are replacing. Another option is to have replacement pipes fabricated to the exact specifications of the repair. However, having replacement pipes specially fabricated requires the user to precisely measure for the specifications, place the order, and wait for the delivery of the fabricated component. This results in a delay in the component being available for installation, as well as an increased cost to the user.

Accordingly, this inventor believes that there is a need for a more economical solution for fabrication of replacement parts, as well as a solution that car enthusiasts will be more likely to utilize.

SUMMARY OF THE INVENTION

In view of the foregoing, this inventor has devised a SMART BEND™ tube product (SMART BEND is a trademark of PROTO-1 MANUFACTURING, L.L.C.) that will meet the car enthusiast market. The tube product and method of the present disclosure provides a solution for repairing a portion of an exhaust system by bending a tube that has pre-formed bellows in it. The pre-formed bellows allow for the bending of the SMART BEND™ tube into the particular configuration needed for the specific exhaust connection. The SMART BEND™ tube can have a variety of end forms to allow for the connection required for any specific application. A custom tube "bender" structure is provided to achieve the tube bending functionality of the present disclosure.

The foregoing and other features of the tube and tube bender of the present invention will be apparent from the detailed description that follows.

DETAILED DESCRIPTION

The SMART BEND™ tube allows a user to make necessary exhaust connections without needing to wait for a fabricated component to be manufactured and delivered. The pre-formed tube has the features needed for connecting the tube to the system; thus, the tube simply needs to be bent into position or to the necessary configuration in order to be used. A simple bend may require a SMART BEND™ tube with a single set of bellows, while a compound bend may require a SMART BEND™ tube with multiple sets of pre-formed bellows. The bend is accomplished through the use of a small custom bender, an air impact wrench, and a compressor. These bends can be created in a user's garage as the user is making repairs to the existing exhaust or making a connection or modification to an aftermarket exhaust system.

Figure 1:
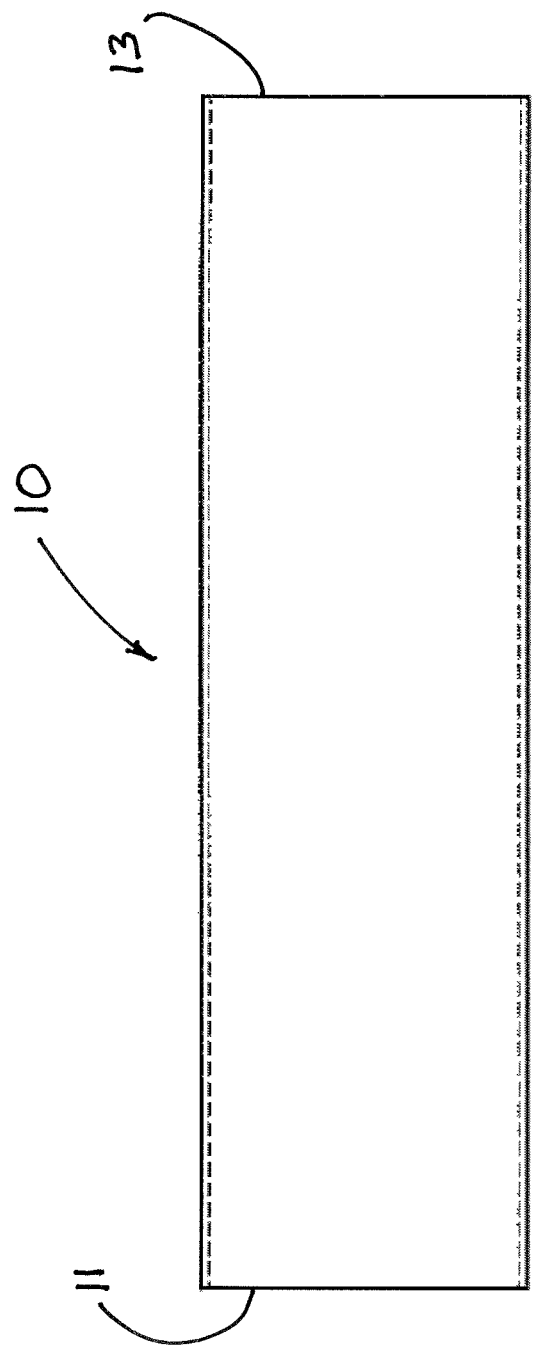
FIG. 1 is a side and cross-sectioned view of a length of raw tube of the type that would be used to form the tube consistent with the present disclosure.
Figure 2:
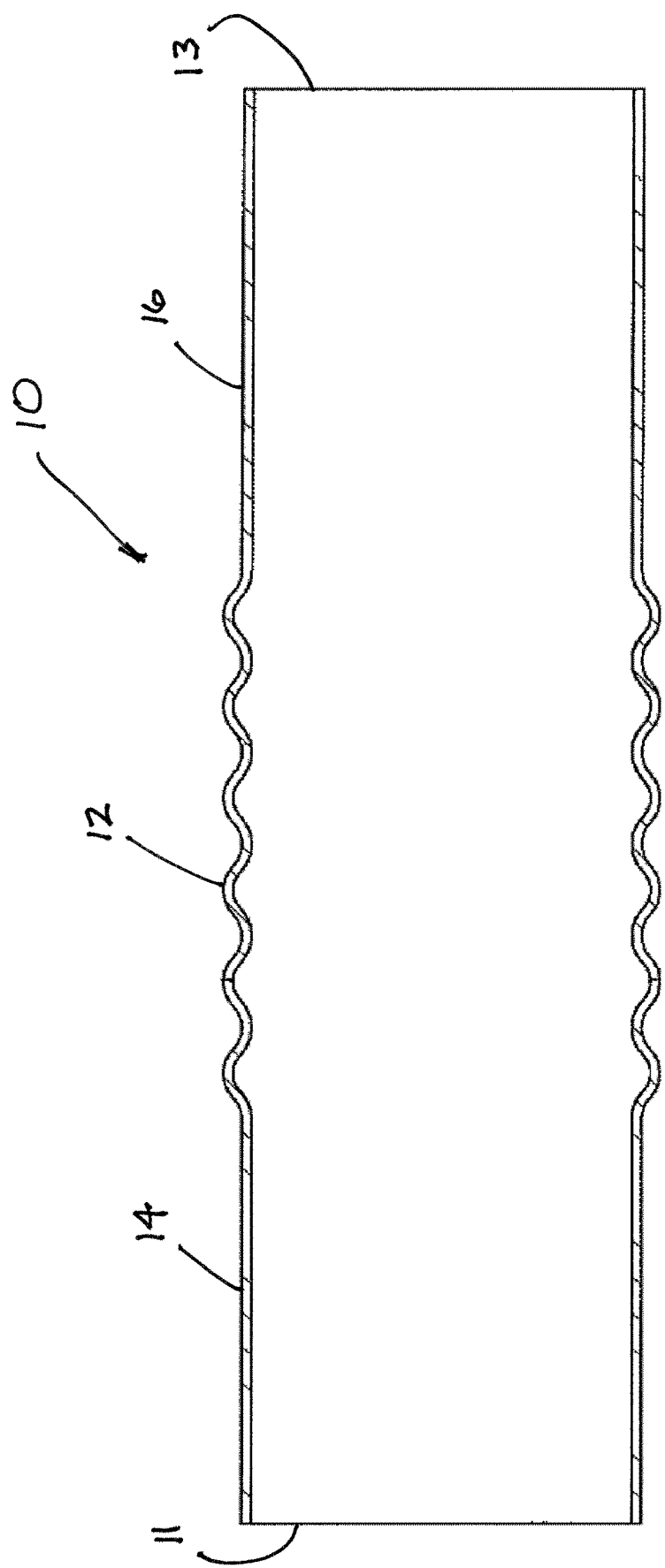
FIG. 2 is an enlarged side and cross-sectioned view of the tube shown in FIG. 1 showing a section where the tube is shaped into a wave-like, rippled, or undulated shape.
Figure 3:
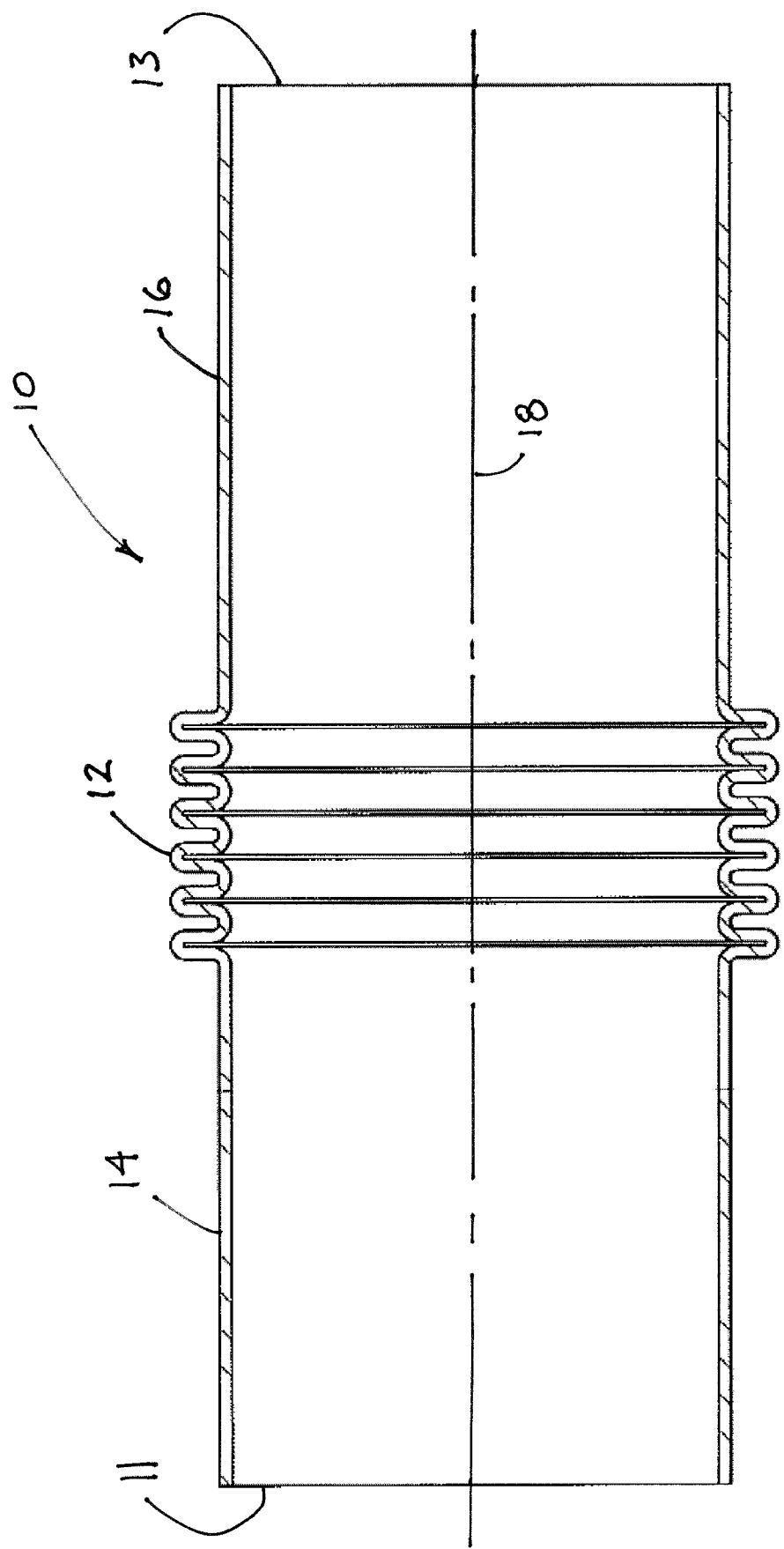
FIG. 3 is a further enlarged side and cross-sectioned view of the tube shown in FIG. 2 showing the bellow structure formed after crushing of the undulated shape of the tube.

Referring now to the drawings in detail, wherein like-numbered elements refer to like elements throughout, FIG. 1 illustrates a raw tube, generally identified 10. Moving from one end 11 of the tube 10 to the other end 13, it will be seen that tube 10 comprises a centrally-disposed undulated portion 12, flanked to either side by cylindrical portions 14 and 16. See FIG. 2. Once the tube 10 is presented in this described shape, the undulated portion 12 is crushed to form a single bellow portion 12 that is bendable in 360 degrees relative to the axis 18 of the tube 10. See FIG. 3.

Figure 4:
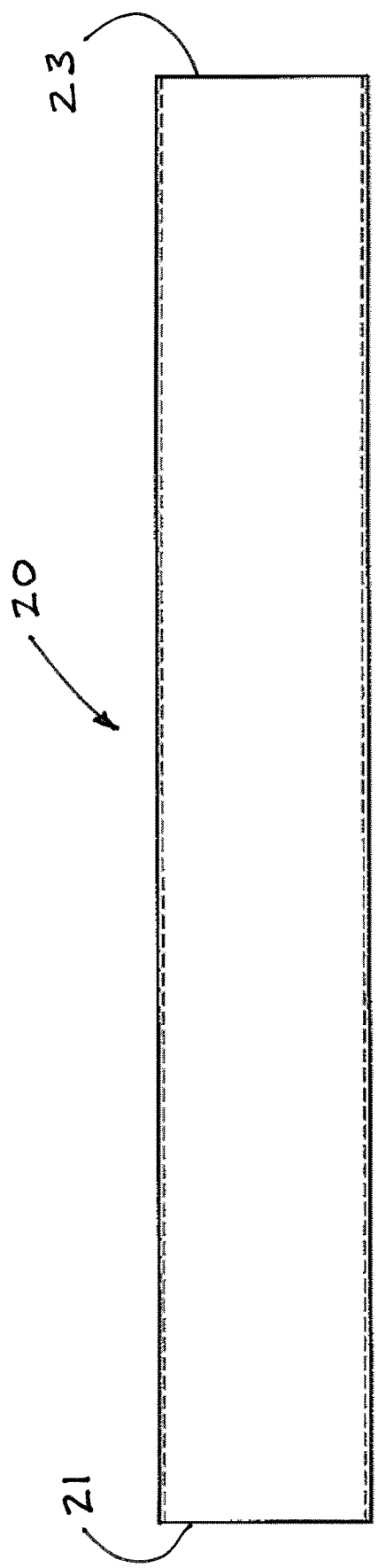
FIG. 4 is a side and cross-sectioned view of another length of raw tube.
Figure 5:
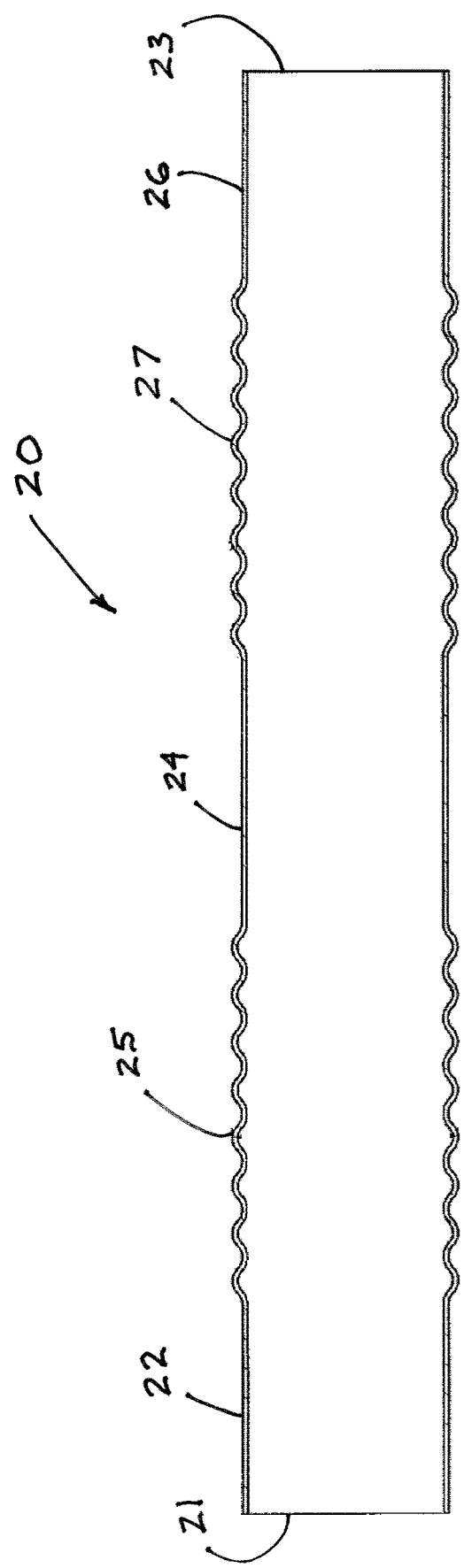
FIG. 5 is an enlarged and cross-sectioned view of the tube shown in FIG. 4 showing two sections where the tube is formed into an undulated shape.
Figure 6:
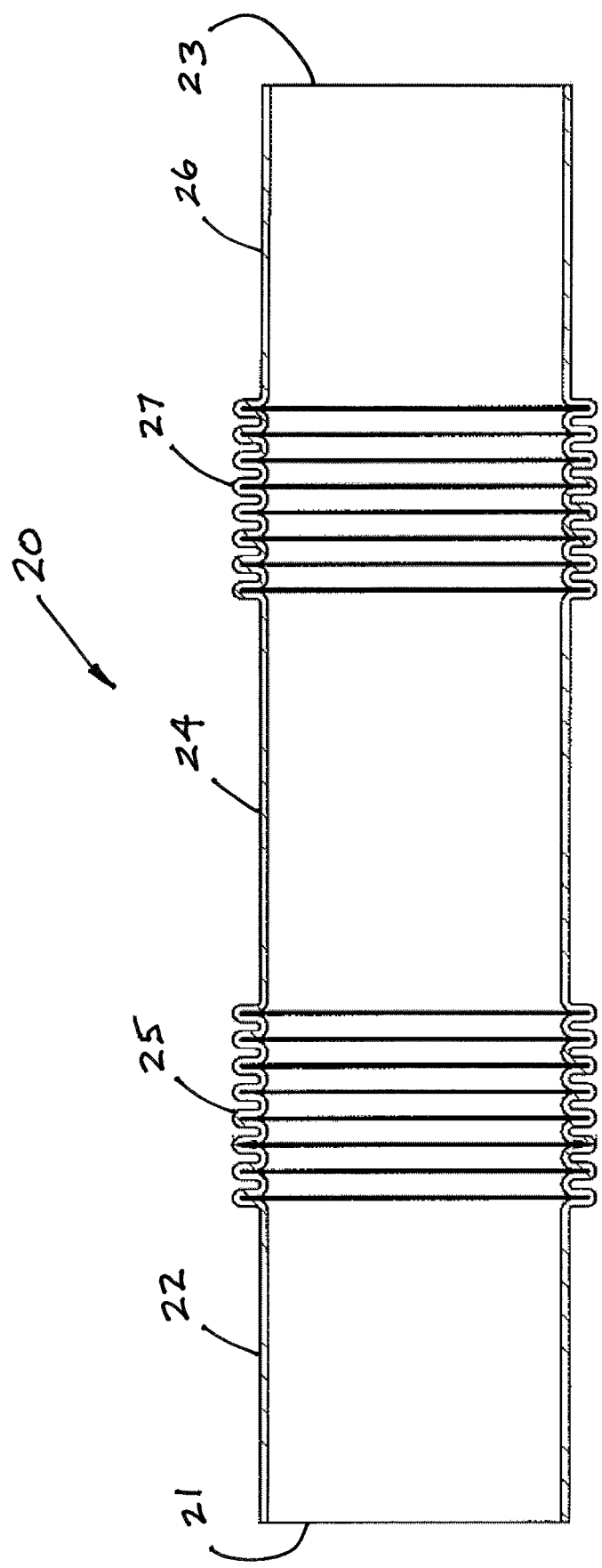
FIG. 6 is a further enlarged side and cross-sectioned view of the tube shown in FIG. 5 showing the bellow portions formed after crushing of the undulated shape of the tube.

FIG. 4 illustrates another length of raw tube, generally identified 20. Moving from one end 21 of the tube 20 to the other end 23, it will be seen that the tube 20 is formed such that a first portion 22 of the tube remains in a cylindrical form. See FIG. 5. A second portion 25 of the tube 20 is undulated. A third portion 24 of the tube 20 is cylindrical. The fourth portion 27 of the tube 20 is also undulated, while the fifth portion 26 is cylindrical. Once the tube 20 is presented in this described shape, the undulated portion 25 and 27 are crushed to form two bendable bellows portions. See FIG. 6.

Figure 7:
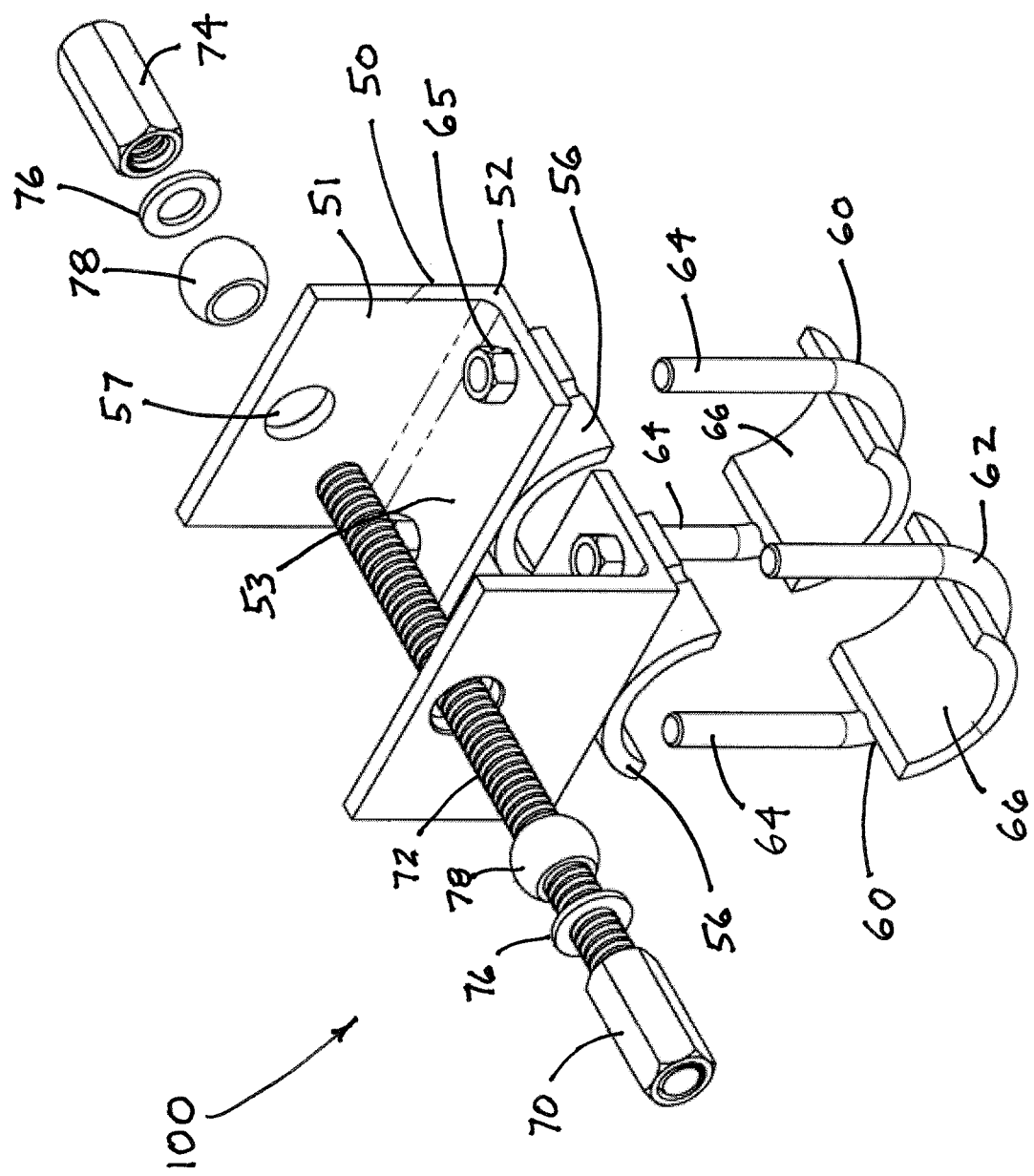
FIG. 7 is a top, front, and right side perspective view of a bender consistent with the present disclosure.

To bend the SMART BEND™ tube 10 or 20 into the needed configuration, the user first mounts the tube 10 or 20, or a portion of the tube, into a small custom bender, generally identified 100. See FIG. 7. As shown, the bender 100 comprises several components. Bender 100 includes a pair of opposing welded brackets 50. Each bracket 50 includes an L-shaped portion 52, with each bracket 50 comprising an L-shaped portion 52 having a substantially vertical member 51 and a substantially horizontal member 53. The horizontal member 53 further comprises a bottom surface (not shown). An arcuate member 56 is secured to the bottom surface via welding or other connection means. In some examples, the arcuate member corresponds to, or matches, the circumferential arc of the tube 10 and 20. An aperture 57 is further defined in the vertical member 51, and two apertures (not shown) are defined in the horizontal member. Each bracket 50 may be considered a primary tube securement means.

Below each bracket 50 is a secondary tube securement means. The second tube securement means comprises a structure 60, which secures a tube 10, 20 between it and the bracket 50. The structure 60 comprises an arcuate member 66 secured to a U-shaped bracket 62. U-shaped bracket 62 comprises a pair of upwardly-extending, threaded posts 64. The threaded portion of each post 64 is receivable by a like-threaded hex nut 65. In this configuration, a portion of the tubes 10, 20 can be secured between the L-shaped bracket 50 and the U-shaped bracket 60 via tightening hex nuts 65 to the posts 64.

In addition to the L-shaped brackets 50 and the U-shaped brackets 60, bender 100 further comprises a driving rod subassembly, generally identified 70. The driving rod subassembly 70 comprises a driving rod 72, a coupling nut 74, a pair of thrust-bearing washers 76, and a pair of pivot joint balls 78. The driving rod 72 may mate with an impact wrench (not shown) driven by a compressor (not shown); however, the driving rod may be engaged in other ways. The pivot joint balls 78 have a diameter that is greater than the diameter of the apertures 57 of the L-shaped brackets 50, allowing each pivot joint ball 78 to nest within an aperture 57 of an L-shaped bracket 50.

In application, an L-shaped bracket 50 and a U-shaped bracket 60 are secured to a portion of a tube, such as cylindrical portions 14 or 16 of tube 10 or cylindrical portions 22, 24, or 26 of tube 20. Other L-shaped brackets 50 and U-shaped brackets 60 are secured to another portion of the tube, such as cylindrical portions 14 or 16 of tube 10 or cylindrical portions 22, 24, or 26 of tube 20. The location of the other brackets 50 and 60 are dependent on where the first L-shaped bracket 50 and U-shaped bracket 60 are secured. For example, a SMART BEND™ tube 10 having a single bellow portion 12 may have a first L-shaped bracket 50 and a first U-shaped bracket 60 one side of bellow portion 12 and a second L-shaped bracket 50 and a second U-shaped bracket 60 on the opposite side of bellow portion 12, such that brackets 50 and 60 straddle the bellow portion 12.

Once bender 100 is mounted to a SMART BEND™ tube 10, 20, an impact wrench is used to drive a lead screw on the bender 100 to bend the tube 10, 20, at the bellow portion. The driving rod 72 is rotated to bend the tube 10, 20. Rotation of the driving rod 72 draws the vertical members 51 of the L-shaped brackets 50 towards one another while simultaneously pushing the U-shaped brackets 60 away from one another. This imparts a bending of the bellow portion, such as bellow portion 12, such that the inner curve shape of the bellow portion is maintained while the outer curve is expanded. The pivot joint balls 78 allow the vertical bracket members 51 to move from a substantially parallel position with respect to one another to angular positions. Once the tube and the bellow portion is bent to the angle needed, the custom bender 100 can be removed and the SMART BEND™ tube can be installed into the exhaust system.

In the case of a compound bend, the multiple-bellowed SMART BEND™ tube 20 is used. The bender brackets 50, 60 are mounted onto one cylindrical portion 22, 24, 26 of the tube 20. In this case, the bender brackets 50, 60 will be mounted such that they straddle one of the bellow sections 25, 27. The first bellow section 25, 27 is bent using the driving rod 72 to the desired angle. Once that angle is achieved, the bender 100 is removed and remounted on the other end of the tube 20. The bender 100 may be rotated around the tube 20 such that the compound bend may be accomplished at any set of angles. The bender brackets 50, 60 are then remounted and the second bellow section 25, 27 is bent using the driving rod 72. Once the second bend is achieved, the bender 100 is again removed, resulting in a SMART BEND™ tube 20 with a compound bend profile.

The invention claimed is:

1. A system, comprising:
   a tube, the tube comprising:
   a first cylindrical portion;
   a second cylindrical portion; and
   an undulated portion disposed between the first cylindrical portion and the second cylindrical portion; and
   a bender, the bender further comprising:
   a plurality of L-shaped brackets;
   a plurality of U-shaped brackets; and
   a driving rod subassembly comprising:
   a driving rod;
   a coupling nut;
   a pair of thrust-bearing washers; and
   a pair of pivot joint balls.

2. The system of claim 1, wherein the undulated portion of the tube is compressible to form a bellows portion.

3. The system of claim 1, wherein the tube further comprises:
   a third cylindrical portion; and
   a second undulated portion disposed between the second cylindrical portion and the third cylindrical portion.

4. The system of claim 1, wherein the plurality of L-shaped brackets further comprises:
   a substantially vertical member;
   a substantially horizontal member, wherein the horizontal member includes a bottom surface;
   an arcuate portion coupled to the bottom surface of the horizontal member;
   a first aperture defined in the substantially vertical member; and
   a pair of apertures defined in the substantially horizontal member.

5. The system of claim 4, wherein the arcuate portion has a circumferential arc matching a circumferential arc of the tube.

6. The system of claim 1, wherein the plurality of U-shaped brackets further comprise:

a U-shaped bracket comprising a pair of upwardly extending posts, wherein each post of the pair of upwardly extending posts is threaded;

an arcuate member coupled to the U-shaped bracket; and a pair of threaded hex nuts to be received by each upwardly extending post of the pair of upwardly extending posts.

7. The system of claim 1, wherein an upper surface of the tube is received by the L-shaped bracket and a lower surface of the tube is received by the U-shaped bracket.

8. The system of claim 1, wherein each pivot joint ball of the pair of pivot joint balls is received by the first aperture of the L-shaped bracket.

9. The system of claim 8, wherein:

the first aperture of the L-shaped bracket has a first diameter; and the pivot joint ball has a second diameter that is greater than the first diameter such that the pivot joint ball nests within the first aperture.

\* \* \* \* \*